United States Patent
Georgy

(10) Patent No.: US 9,001,261 B2
(45) Date of Patent: Apr. 7, 2015

(54) OPTICAL FOCUS OF AN IMAGE ACQUISITION SYSTEM

(71) Applicants: Astrium SAS, Suresnes (FR); Centre National d'Etudes Spatiales C N E S, Paris (FR)

(72) Inventor: Pierre-Luc Georgy, Toulouse (FR)

(73) Assignees: Airbus Defence and Space SAS, Les Mureaux (FR); Centre National d'Etudes Spatiales C N E S, Paris (FR)

( * ) Notice: Subject to any disclaimer, the term of this patent is extended or adjusted under 35 U.S.C. 154(b) by 0 days.

(21) Appl. No.: 14/092,333

(22) Filed: Nov. 27, 2013

(65) Prior Publication Data

US 2014/0168502 A1 Jun. 19, 2014

(30) Foreign Application Priority Data

Dec. 14, 2012 (FR) ...................................... 12 03419

(51) Int. Cl.
| | |
|---|---|
| *G03B 13/00* | (2006.01) |
| *H04N 5/232* | (2006.01) |
| *H04N 5/228* | (2006.01) |
| *H04N 3/14* | (2006.01) |
| *H04N 5/335* | (2011.01) |
| *G02B 13/16* | (2006.01) |
| *H04N 5/225* | (2006.01) |
| *G03B 41/00* | (2006.01) |
| *G02B 7/28* | (2006.01) |
| *G02B 7/38* | (2006.01) |

(52) U.S. Cl.
CPC ............ *H04N 5/23212* (2013.01); *G02B 7/285* (2013.01); *G02B 7/38* (2013.01)

(58) Field of Classification Search
USPC .......... 348/207.1, 222.1, 294–324, 335–357; 396/72–152, 322–340
See application file for complete search history.

(56) References Cited

U.S. PATENT DOCUMENTS

| | | | | |
|---|---|---|---|---|
| 4,449,151 | A  * | 5/1984  | Yokota et al. ................. | 358/483 |
| 5,144,448 | A  * | 9/1992  | Hornbaker et al. ........... | 348/324 |
| 6,181,441 | B1 * | 1/2001  | Walsh ........................... | 358/474 |
| 6,195,471 | B1 * | 2/2001  | Larsen .......................... | 382/284 |
| 6,348,981 | B1 * | 2/2002  | Walsh ........................... | 358/474 |
| 8,817,340 | B2 * | 8/2014  | Roth et al. .................... | 358/474 |
| 8,885,059 | B1 * | 11/2014 | Venkataraman et al. .. | 348/218.1 |
| 2004/0240052 | A1 * | 12/2004 | Minefuji et al. .............. | 359/435 |
| 2005/0195722 | A1 * | 9/2005  | Tsukamoto et al. .......... | 369/103 |

(Continued)

FOREIGN PATENT DOCUMENTS

EP 1533999 A2 5/2005

OTHER PUBLICATIONS

Search Report from related application FR 1203419, including machine translation of written opinon, dated May 15, 2013, 10 pgs.

(Continued)

*Primary Examiner* — Michael Osinski
(74) *Attorney, Agent, or Firm* — Patterson Thuente Pedersen, P.A.

(57) ABSTRACT

A method for characterizing an optical focusing defect of an image capture instrument is based on contrast values. Said contrast values are calculated for two images of a same scene portion, captured in respective overlapping length segments of two image sensors. To this end, the sensors are mounted in an image capture instrument so that the overlapping length segments between the sensors are situated at different heights along a focusing direction perpendicular to said sensors.

25 Claims, 6 Drawing Sheets

(56) References Cited

U.S. PATENT DOCUMENTS

| | | |
|---|---|---|
| 2007/0025713 A1* | 2/2007 | Hosono .................. 396/72 |
| 2008/0024649 A1* | 1/2008 | Okawara ................ 348/347 |
| 2008/0117316 A1* | 5/2008 | Orimoto ................ 348/240.3 |
| 2008/0128599 A1* | 6/2008 | Stam et al. ................ 250/226 |
| 2008/0303914 A1* | 12/2008 | Akiyama ................ 348/222.1 |
| 2009/0059046 A1* | 3/2009 | Hasegawa ................ 348/296 |
| 2010/0141802 A1* | 6/2010 | Knight et al. ................ 348/240.3 |
| 2011/0141309 A1* | 6/2011 | Nagashima et al. ....... 348/222.1 |
| 2011/0211068 A1* | 9/2011 | Yokota ................ 348/139 |
| 2012/0147224 A1* | 6/2012 | Takayama ................ 348/241 |
| 2012/0154667 A1* | 6/2012 | Takeuchi ................ 348/348 |
| 2014/0118571 A1* | 5/2014 | Dahlgren ................ 348/222.1 |
| 2014/0125810 A1* | 5/2014 | D'Amico et al. ........... 348/164 |
| 2014/0231650 A1* | 8/2014 | Streuber et al. ............ 250/349 |

OTHER PUBLICATIONS

Liu, X.Y., et al, "Dynamic evaluation for autofocusing for automated microscopic analysis of blood smear and pap smear", Journal of Microscopy, vol. 227, pt 1 2007, pp. 15-23.

Lu, Zhenhua, et al., "Realization of the Imaging-Auto-Focus on the APRC Using Splicing-CCD", Proc. of SPIE, vol. 8285, 2011, 8 pgs.

* cited by examiner

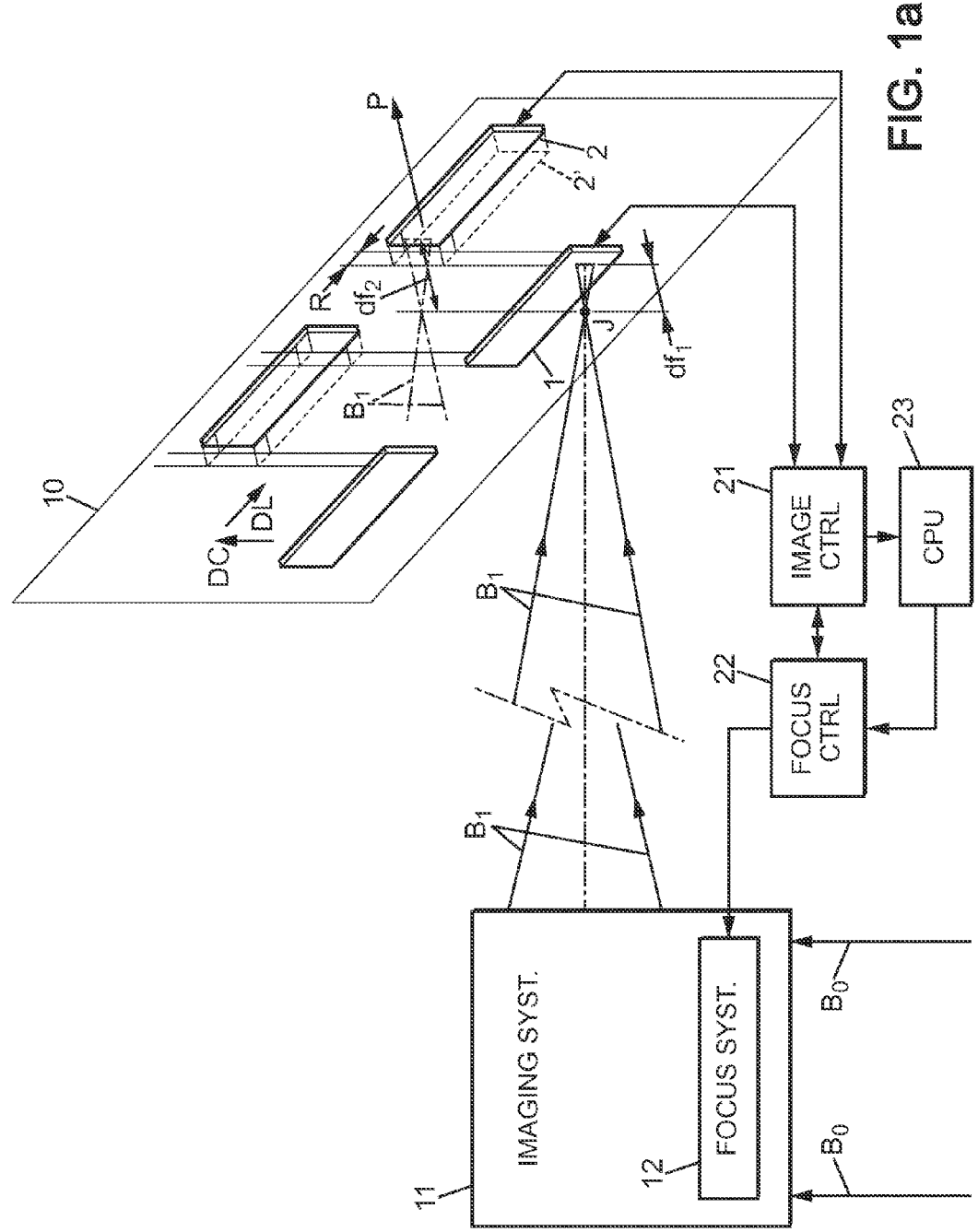

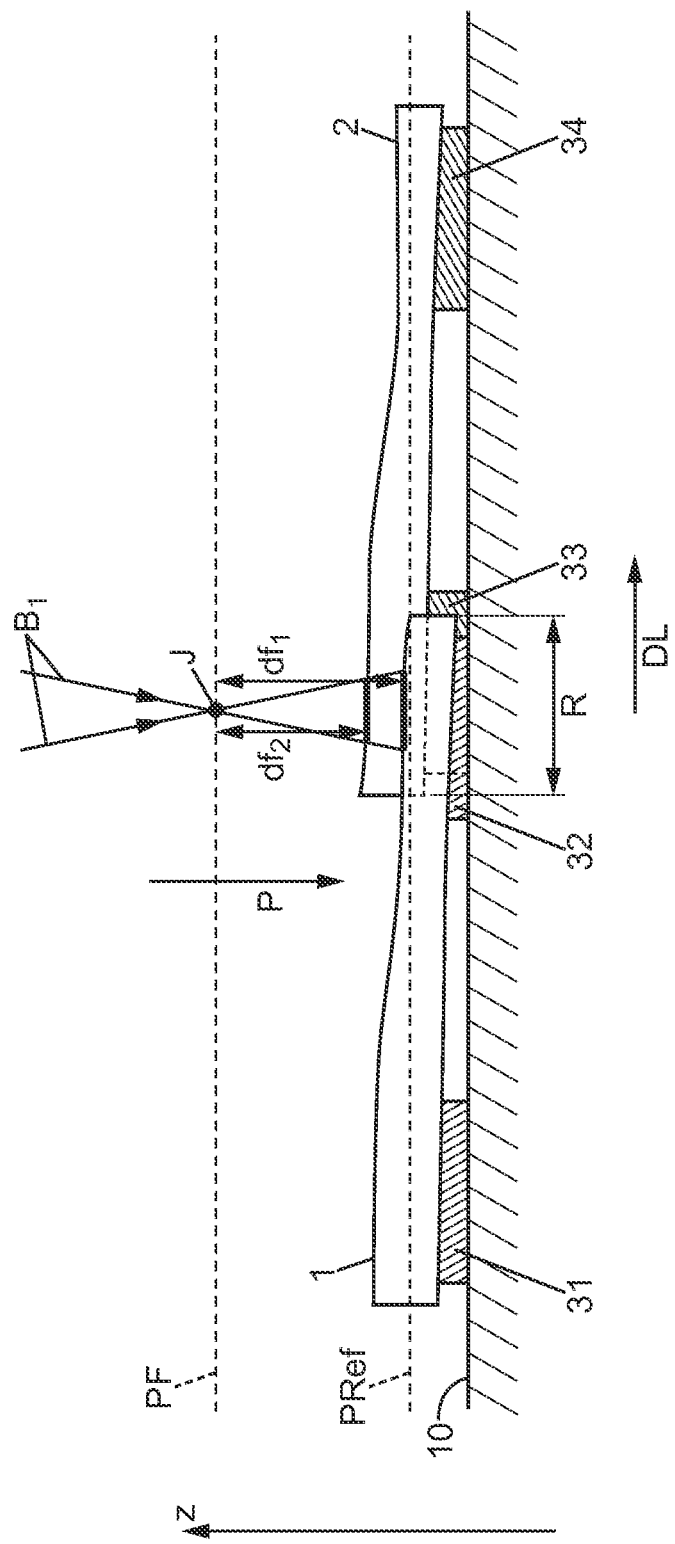

OPTICAL FOCUS OF AN IMAGE ACQUISITION SYSTEM

RELATED APPLICATION

The present application claims priority to French Application No. 12 03419 filed Dec. 14, 2012, which is incorporated herein in its entirety by reference.

FIELD OF THE INVENTION

The present invention concerns a method for characterizing an optical focusing defect in an image capture instrument, the instrument suitable for this method, as well as a method for assembling that instrument

BACKGROUND OF THE INVENTION

Focusing an image capture instrument consists in bringing about the coincidence of a plane in which an image is formed by an optical system, with an image detection plane in which a photosensitive surface of at least one image sensor is situated.

In the cameras intended for the consumer market, the image formation optical system is a lens in which the focal length can be adjusted by moving at least one of the lenses. The image sensor is fixed and optical focusing consists in moving the mobile lens until the image formation plane is superimposed on the photosensitive surface of the image sensor. Optical focusing can then be used to acquire sharp images of scenes captured with variable distances. Several automatic focusing, or "autofocus," methods are known. In these methods, several test images are acquired successively before the final image by intentionally modifying the lens adjustment. All the test images contain a shared portion of the optical field of the final image, which can be all or part of this optical field. An analysis of the test images is used to obtain a relative estimate of the defect in the optical focus that exists for each of them. An estimate of the adjustment that will produce the focus is then extrapolated, or a progressive approach to this adjustment is used, or the two methods are combined to more rapidly obtain the final optical focus adjustment. The final image is then acquired by using the focus adjustment that has thus been determined.

Another field of imaging is that whereby an image is captured by satellites or spacecrafts. In this case, the image formation optics may be a telescope and the photographed scene is always very distant, so that the imaging plane is the focal plane of the telescope. But the position of the focal plane can vary, especially because of thermo-elastic deformations that affect the optics, even more so when the dimensions of the optics are large. Various optical focusing systems that have been adapted to spatial conditions and to the large dimensions of the optical components used are, therefore, implemented. However, the methods used for mass-market photography are not well suited to the requirements of spatial imaging, when characterizing a focusing defect that exists for a given adjustment of the image capture instrument. Mainly, the satellite or spacecraft onboards which the instrument is loaded can move rapidly with respect to the scene photographed, so that it is difficult to successively capture several test images of the same scene, and very disadvantageous in terms of productivity.

The article entitled "Realization of Imaging-Auto-Focus on the APRC Using Splicing-CCD" by Zhenhua Lu et al., Proc. of SPIE, vol. 8285, 82854L-1 (International Conference on Graphic and Image Processing, 2011), describes an optical focusing method that is specifically adapted to the known method of image capture known as "push-broom." In this method, a series of images are successively captured as a band of the optical field, known as the scan swath, is swept over a longitudinal direction. The scanning of the scan swath occurs as the satellite travels above the scene. The method described in this article uses several image sensors arranged in two rows within a shared image capture plane, the two rows being perpendicular to the apparent motion of the scene in this plane. The method is based on the following conditions:

- detectors each in a different row have overlapping portions of their respective photosensitive surfaces, in projection on the direction of the rows;
- two images are successively captured in synchronized manner using across-track scanning, so that a same portion of the scene is captured in the image, first by a part of a detector of the first row, then by a part of detector of the second row; and
- adjustment of optical focus is varied between the two images, to then compare the different focusing defects that respectively affect the two images of the same portion of a scene. A modification of the focus can then be determined, at least a direction of such modification, to reduce the focusing defect.

Such method therefore requires the activation of an optical focusing system between two images successively captured during the scan. However, optical focusing systems that are compatible with the conditions of use on-board a satellite or spacecraft are often slow, so that the method is not well suited for rapid scans.

For the same reason, whenever scanning is too rapid for a given method to be implemented, the two images of the same scene are limited to portions of the photosensitive surface of the image sensors that correspond to approximately 1,000 lines of picture points, or pixels, by counting the lines perpendicularly to the direction of the rows of sensors. Yet, many methods for characterizing optical focusing defects are based on a statistical evaluation of the differences between intensities that are individually captured by pixels. The optical focusing defect can, therefore, be determined with greater reliability when each of the two images of the same scene has a large number of pixel rows.

SUMMARY OF THE INVENTION

A first object of the present invention is the characterization of an optical focus defect of an image capture instrument, even when the scene is moving rapidly in the image capture plane.

A second object of the invention is the improvement of the reliability and/or precision of the characterization of the optical focus defect.

A third object of the invention consists in proposing such a method, which can be used on-board a satellite or a spacecraft. In particular, the method should require a minimum amount of specific additional equipment to avoid increasing to much the total mass of the satellite or spacecraft.

Finally, a fourth object of the invention consists in characterizing the optical focus defect without requiring test images that cannot be also used to analyze the content of the photographed scene.

To achieve at least some of these objects as well as others, the invention proposes a method for characterizing an optical focus defect of an image capture instrument, when the instrument comprises:

- an image formation optical system suitable for forming an image of a scene in at least one focal plane;

at least two image sensors, each of which comprises a set of elements for detecting pixels arranged at intersections of at least one line and columns of a sensor matrix, both sensors being placed parallel to said at least one focal plane and oriented so that directions of respective lines of sensors are identical or optically conjugated by a focal plane duplication system, the two sensors being offset to one another parallel to the directions of the lines, with a partial overlap of those sensors in the directions of lines, so that each sensor has a length segment overlapping the other sensor and a complementary segment that does not overlap the other sensor;

a control unit which is suitable for controlling a coordinated image capture function between the two sensors; and an optical focusing system which is suitable for moving said at least one focal plane of the image formation optical system with respect to the sensors in a direction perpendicular to each sensor.

In the context of the present description, by length segment of a sensor overlapping another sensor, we mean a disposition of the two sensors wherein geometric overlap appears between the matrix of one of the sensors and a projection of the matrix of the other sensor. The considered projection is carried out with a projection direction that is perpendicular to the lines of the two sensors, or perpendicular to the lines of one of the sensors and to the lines of a fictional matrix that is conjugated to the matrix of the other sensor by the focal plane duplication system. The overlap is thus formed between length segments of the sensors, which are parallel to their respective line directions, through perpendicular projection onto those line directions.

The method of the invention comprises the following steps:

/1/ capturing two images of a same portion of the scene respectively with both of the two sensors in the respective overlapping length segments of those sensors;

/2/ calculating two values of a contrast separately for the two images of the same scene portion; and /3/ deriving a direction of the optical focus defect in the direction perpendicular to each sensor based on a comparison of the contrast values that are calculated respectively for the two images of the scene portion.

According to a first characteristic of the method of the invention, the two sensors are mounted within the instrument with respective average heights that differ in their overlapping length segments. To this purpose, these heights are measured along the direction perpendicular to each sensor with respect to a shared reference plane or reference planes respectively associated with each sensor and conjugated with one another by the focal plane duplication system.

According to a second characteristic of the method of the invention, the two images captured in step /1/ use the same adjustment of the focusing system, so that said at least one focal plane of the image formation optics is situated, for both images, at different respective defocusing distances of the two sensors.

Thus, in the method according to the invention, the different optical focus defects that exist for the captured images are caused by differences in the height of the image sensors in their overlapping length segments. This difference between the focus defects results from the first characteristic, which involves the construction of the image capture instrument. Simultaneous accurate focus in both overlapping length segments of the sensors is, therefore, impossible. No modification of the optical focus of the instrument occurs between the two images so that the duration between the two images is not limited in the direction of its reduction by the speed of operation of the optical focusing system. The method of the invention is, therefore, compatible with a rapid change of the photographed scene, which is the case for the push-broom method of image capture, in particular.

For the same reason, each image of the scene portion that is common to both sensors and which is used to determine the direction of the optical focus defect may have a large number of lines counted along the direction of the columns of each sensor. Characterization of the optical focus defect can then be more reliable.

The method of the invention especially has the following advantages:

it does not require additional equipment dedicated solely to the implementation of this method;

it can be easily used on board a satellite or spacecraft. In particular, the controls and image processing sequences used can be executed autonomously and automatically on board the satellite or spacecraft without requiring the remote intervention of an operator; and the two images captured in step /3/ can also participate in an imaging function through their image content. In other words, they need not be dedicated solely to the function of characterizing the optical focusing defect.

A method according to the invention is compatible with a disposition of two image sensors wherein each is parallel to the same focal plane of the image formation optics. In this case, this shared focal plane is substantially parallel to the respective photosensitive surfaces of the two image sensors.

But the invention is also compatible with a disposition of two image sensors parallel to focal planes of the image formation optics that are different. Such a structure of an image capture instrument can be useful, especially, when each image sensor has a peripheral frame that does not participate in its photosensitive surface and that prevents the photosensitive surfaces of the two sensors from being sufficiently close. In this case, the image formation optics comprises a focal plane duplication system that is suitable for producing several focal planes that are optically conjugated with one another by this duplication system.

The invention also proposes an image capture instrument that comprises:

the image formation optical system, the two image sensors, and the control unit that were introduced previously;

an optical focusing system, which is suitable for moving said at least one focal plane of the image formation optics with respect to the sensors in a direction perpendicular to each sensor; and a focusing controller, which is suitable for controlling the execution of steps /1/ to /3/ in cooperation with the control unit.

The two sensors are mounted inside the instrument in accordance with the first characteristic described above, and the focusing controller is suitable for also implementing the second characteristic of the method.

An image capture method and instrument consistent with the invention may advantageously make use of the following improvements, implemented individually or in combination:

the direction of the focusing defect when it is counted from said at least one focal plane, is determined in step /3/ as originating from a photosensitive surface position of the two sensors with the highest contrast value, toward a photosensitive surface position of the sensor with the lowest contrast value, the positions of the photosensitive surfaces being identified for the overlapping length segments of the two sensors;

a difference between the respective average heights of the two sensors in the respective overlapping length segments may be greater than an average variation of individual levels of the pixel detection elements in each length segment of one of the sensors that overlaps the other sensor, these levels being measured along the direction perpendicular to each sensor;

the difference between the respective average heights of the two sensors in the respective overlapping length segments may be greater than 20 μm;

the difference between the respective average heights of the two sensors in the respective overlapping length segments may be less than a threshold value for the optical focusing defect, which corresponds to a degradation of the resolution of a captured image;

the difference between the respective average heights of the two sensors in the respective overlapping length segments may be greater than the difference between the respective average heights of the sensors in the complementary segments without overlap;

the two sensors may each have a single line of pixel detection elements, counted along a direction of columns of the sensor, or the two sensors may each be of the "time delay integration," or TDI, type;

a complete image can be acquired in step /1/ by also using the complementary segments without sensor overlap, wherein this complete image includes the two images of the scene portion captured with redundancy by the overlapping length segments of the sensors;

the two sensors may also be offset to one another parallel to the column direction of each sensor. In this case, the control unit may be adapted to control the execution of step /1/ so that the two images are captured respectively by both sensors with a delay between these two images that corresponds to a displacement of the scene portion in said at least one focal plane from one of the two sensors to the other sensor along the column direction. The invention can then be used during an imaging sequence with scanning, especially with push-broom type scanning;

the following additional step may be carried out after step /3/:

/4/ activating the focusing system to displace said at least one focal plane of the image formation optics in the direction opposite that of the focusing defect;

step /3/ may also comprise a calculation by extrapolation of a coarse adjustment of the focusing system to move said at least one focal plane closer to an average position of the sensors along the direction perpendicular to each sensor, the coarse adjustment being extrapolated from the contrast values calculated respectively for the two images of the scene portion.

The invention further proposes an assembly method for an image capture instrument that comprises the following steps:

supplying an image formation optical system, a control unit, an optical focusing system, and a focusing controller as described previously; and placing the two sensors in said at least one focal plane as described previously.

The assembly method also comprises the following step:

adjusting the respective average heights of the two sensors within the instrument so that those average heights are different in the two sensors in the respective overlapping length segments, the heights being measured along the direction perpendicular to each sensor with respect to a shared reference plane or reference planes respectively associated with each sensor and conjugated with one another by the focal plane duplication system.

Such an assembly process can be applied to an image capture instrument as described above and/or adapted to implement a method according to the invention for characterizing an optical focusing defect of an image capture instrument.

The height of each sensor may be adjusted by arranging at least one spacer between the sensor and its support within the instrument.

The sensors may be mounted within the instrument so that a difference is definitively established due to the assembly between the respective average heights of the sensors in the overlapping length segments.

The invention can also be applied to a set of two image capture instruments whose optical entrance fields partially overlap one another. The skilled practitioner understands that the technical problems solved by the invention are similarly applicable to such an assembly of instruments, and that the technical characteristics that solve them according to the invention are identical in principle to those that have been presented above. Consequently, the invention also relates to a method for characterizing an optical focusing defect of one image capture instrument among two image capture instruments, wherein each instrument comprises, separately from the other instrument:

an image formation optical system suitable for forming an image of a scene in a focal plane;

an image sensor which is placed parallel to a focal plane and which comprises an assembly of pixel detection elements arranged at the intersections of at least one line and columns of a sensor matrix; and an optical focusing system which is suitable for moving the focal plane of the image formation optical system with respect to the sensor along a direction perpendicular to the sensor of the same instrument.

The two instruments are arranged in parallel so that the optical entrance fields that are respectively conjugated with the two sensors by their respective image formation optical systems, exhibit a partial overlap in the scene, and the two instruments are oriented around respective optical axes so that lines of pixel detection elements of the two sensors are parallel to a shared direction in the scene. Respective length segments of the two sensors, each of which is conjugated with the overlap of the optical entrance fields, are then referred to as overlapping sensor length segments.

A control unit is also suitable for controlling an image capture operation coordinated between the two instruments.

In this case, the method of the invention comprises the following steps:

/1/ capturing two images of a same portion of a scene respectively with both of two instruments in the respective overlapping length segments of the sensors;

/2/ calculating two values of a contrast separately for the two images of the same scene portion; and /3/ deriving a direction of the focusing defect along the direction perpendicular to each sensor based on a comparison of the contrast values calculated respectively for the two images of the scene portion.

The two images are then captured in step /1/ for respective adjustments that are different for the two focusing systems so that the respective focal planes of the two image formation optical systems are situated for said images at different respective defocusing distances for the two sensors.

In improvements of such application of the invention for a set of two image capture instruments, the direction of the focusing defect for one of the two instruments, determined from the focal plane of that instrument, can be determined in step /3/ as starting from a photosensitive surface position of the one of the two sensors with the highest contrast value, toward a photosensitive surface position of the sensor with the lowest contrast value. To this purpose, the positions of photosensitive surfaces are identified for the length segments which overlap between the two sensors, and are associated with the instrument for which the direction of the focusing defect has been determined.

BRIEF DESCRIPTION OF THE DRAWINGS

Other features and benefits of the present invention will appear from the following description of non-limiting embodiments, by referring to the attached drawings, in which:

FIG. 1a is a block diagram of an image capture instrument according to a first embodiment of the invention;

FIG. 2 is a side view of image sensors arranged according to the invention;

DETAILED DESCRIPTION OF THE DRAWINGS

Figure 1B:
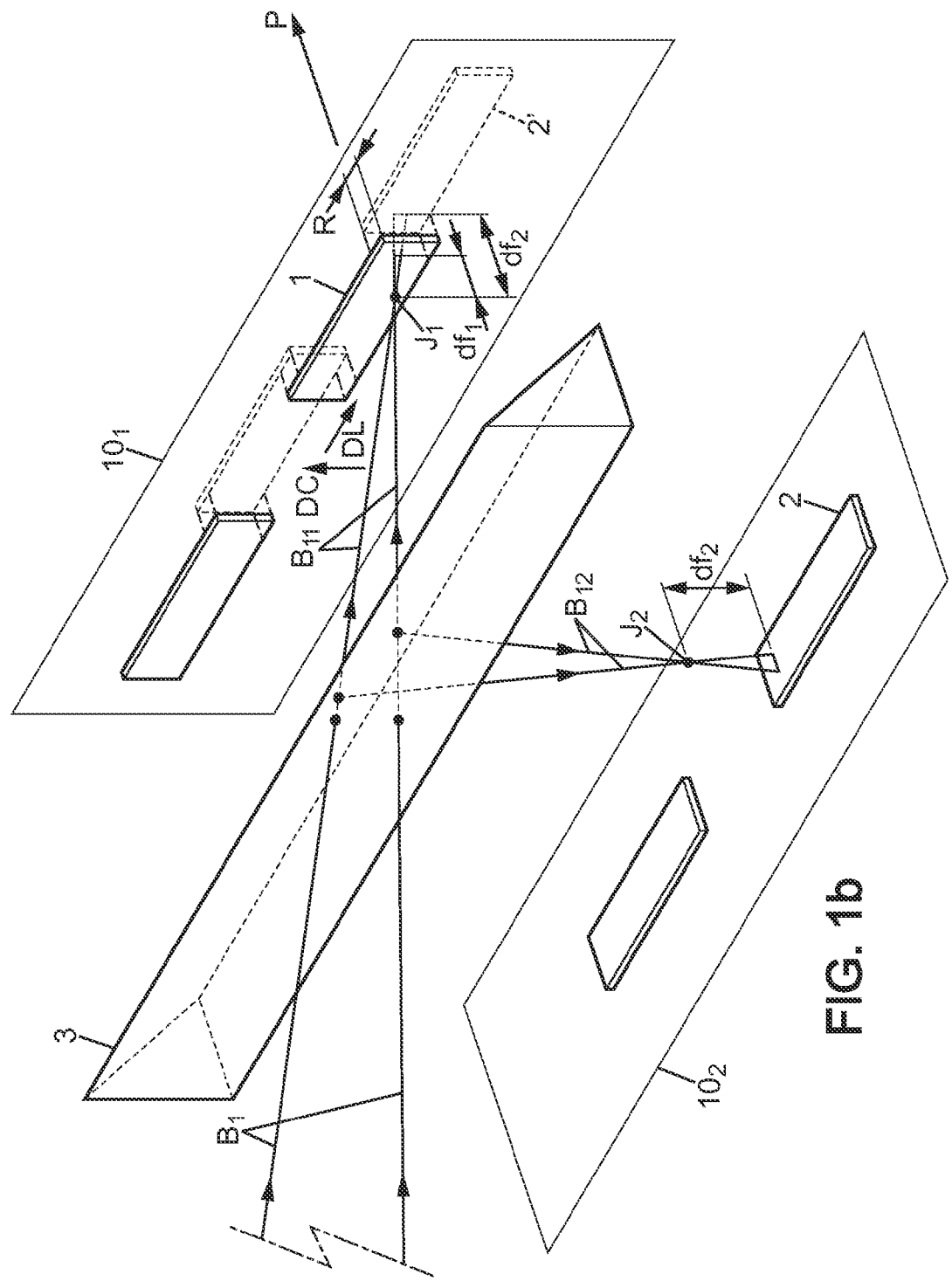
FIG. 1b corresponds to the right-hand side of FIG. 1a for a second embodiment of the invention.

For reasons of clarity, the dimensions of the elements represented in these figures do not correspond to actual dimensions or to actual ratios of dimensions. In particular, some offsets between detectors that are essential to the invention have been exaggerated. Additionally, identical reference numbers shown on different figures refer to identical elements or elements that have identical functions.

Referring to FIG. 1a, an image capture instrument comprises image formation optics 11, shown as "IMAGING SYST." Optics 11 receives as input a beam $B_0$ from a scene located in an entrance optical field of the instrument, and outputs an imaging beam identified as $B_1$. For application to spatial imaging, optics 11 may be a telescope of a model known to the skilled practitioner. Imaging beam $B_1$ converges at a point J of a focal plane of optics 11. This point J varies in the focal plane depending on the direction within the entrance optical field in which is found the element of the scene that corresponds to image point J.

The image capture instrument also comprises an optical focusing system, 12, shown as "FOCUS SYST." System 12 is capable of moving the focal plane in a direction P perpendicular to this plane, for example, by modifying the convergence of imaging beam $B_1$. P is referred to arbitrarily as either depth direction or optical focus direction. Different technologies are known for system 12, especially when optics 11 comprises a telescope. For example, a primary mirror of the telescope may be thermally controlled to modify its curvature, a secondary mirror of the telescope may be moved along the optical axis of the primary mirror, or a mirror that can be deformed by means of actuators may be situated in a pupil of optics 11.

The image capture instrument also comprises at least two image sensors 1 and 2 arranged so that their respective photosensitive surfaces are substantially parallel to the focal plane. Each of sensors 1 and 2 is of the matrix detector type, with elementary photodetectors that individually form a pixel detection element. These photodetectors are arranged at intersections of lines and columns of a matrix inside the photosensitive surface of the sensor. For example, the elementary photodetectors may be square with sides of 13 μm (micrometers), and each sensor 1, 2 may have 12,000 photodetectors per line and any number of photodetectors per column, especially 1 single photodetector per column, or 64 photodetectors per column. The two sensors 1 and 2 are arranged so that their respective lines are substantially parallel from one sensor to the other and thus also for their columns. DL and DC refer, respectively, to the line direction and the column direction, common to the two sensors. The two sensors 1 and 2 are borne by a support, 10, and depth adjusted along direction P. This adjustment forms a characteristic of the present invention and will be described below with reference to FIG. 2.

In particular embodiments of the invention, sensors 1 and 2 may be of the "Time Delay Integration," or TDI, type, given that that each TDI stage constitutes a distinct line of an equivalent matrix. In this case, the TDI sensors may each have 64 TDI stages along the column direction DC, for example. Based on the operation of a TDI sensor, all TDI stages of the same sensor participate in obtaining a single intensity value per column. TDI sensors with 64 columns may, for example, be used for the present invention.

The two sensors 1 and 2 are offset to one another in direction DL so that they have respective length segments that overlap from one sensor to the other in a projection onto direction DL. Thus, each of sensors 1 and 2 has, along line direction DL, an overlapping length segment and a complementary length segment that does not overlap the other sensor. R refers to the overlap length of sensors 1 and 2.

In the first embodiment of the invention, illustrated in FIG. 1a and in which the two sensors 1 and 2 are intended to receive the same imaging beam $B_1$, the two sensors are also offset in column direction DC to enable their partial overlap in line direction DL.

In this way, the following three offsets are implemented between sensors 1 and 2:

a first offset, along line direction DL, which is used to increase the width of the total optical field. This first offset is limited to create the overlap length, R, between the two sensors, which is necessary for the invention;

a second offset, along the focusing direction P, between the respective overlapping segments of the two sensors, which is also necessary for the invention; and a third offset, along the column direction DC, which exists in the embodiment of FIG. 1a but is not essential to the invention. In particular, this third offset may be avoided in the alternative embodiment of the invention shown in FIG. 1b, which will be described below.

Practically, each sensor comprises an optically dead zone (not shown) that surrounds its photosensitive surface, in particular for containing read and control components dedicated to the photodetectors. The width of this dead zone imposes a minimum value on the offset of sensors 1 and 2 along the column direction DC.

To visualize the offsets, the frame in dashed line shown as reference 2' is a projection of the photosensitive surface of sensor 2, bringing the overlap segment of this sensor 2 to the same level along direction P as the overlap segment of sensor 1.

The instrument may possibly comprise additional image sensors, as shown in FIG. 1a. These may also be borne by support 10, each may be aligned with one of sensors 1 or 2 along the line direction DL, while exhibiting additional overlaps that are formed in the same way as the overlap between sensors 1 and 2.

The image capture instrument also comprises:
- a control unit, 21, shown as "IMAGE CTRL," to control a coordinated operation of image sensors 1 and 2;
- an optical focusing controller, 22, shown as "FOCUS CTRL," to characterize, according to the invention, an optical focusing defect of the instrument and control an operation of the focusing system 12; and
- a calculating unit, 23, to analyze intensity values that are produced by the photodetectors of sensors 1 and 2.

In particular, the calculating unit 23 is suitable for calculating contrast values of images or image portions that are captured by each of sensors 1 and 2. For example, these contrast values may be based on differences between intensities that are captured by neighboring photodetectors within each sensor or sensor segment. The calculated contrast may possibly be limited to a combination of intensity differences between neighboring photodetectors along the line direction DL only, or along the column direction DC only. Other formulas and methods of contrast calculation that are known to the skilled practitioner can be used alternatively and equivalently. In particular, it is possible to account for a gain difference that could exist between the sensors by incorporating into the contrast calculation a normalization with respect to average values of the intensities that are captured by the photodetectors of each sensor.

FIG. 1b illustrates an alternative arrangement of sensors 1 and 2 for capturing the images that are formed by optics 11. A focal plane duplication system, shown as 3, divides imaging the beam $B_1$ into two sub-beams $B_{11}$ and $B_{12}$, which are respectively directed to image sensor 1 and image sensor 2. The two sensors 1 and 2 may then be borne by respective supports $10_1$ and $10_2$, which are used to precisely control the positions of the sensors with respect to one another. The two sub-beams $B_{11}$ and $B_{12}$, therefore, converge on two respective focal planes that are conjugated with each other by the duplication system 3. This system 3 can be comprised of one of several ways known to the skilled practitioner. For example, it may be produced by implementing a prism that operates simultaneously for transmission with sub-beam $B_{11}$ and reflection with sub-beam $B_{12}$. Preferably, system 3 may be selected so that the images that are respectively produced by the two sub-beams $B_{11}$ and $B_{12}$ have identical magnifications. Reference 2' in FIG. 1b refers to a location that is conjugated to that of the photosensitive surface of sensor 2 by the focal plane duplication system 3. In other words, location 2' for sensor 2 with respect to sub-beam $B_{11}$ is equivalent to the actual location of the same sensor 2 with respect to sub-beam $B_{12}$. In particular, location 2' reveals offsets with respect to sensor 1 that are optically effective along the three directions of lines DL, columns DC, and focus P.

Thus, location 2', which is conjugated to sensor 2, simultaneously exhibits offset R along the direction of lines DL and a depth offset along the direction P with respect to sensor 1. Because the two sensors 1 and 2 are situated in two different optical paths in this second embodiment of the invention, sensor 2 can be situated on support $10_2$ so that its conjugate location 2' presents a zero offset with respect to sensor 1 along the column direction DC. However, this offset along the direction DC may be any, providing that it is taken into account for the images that are captured in coordinated manner by the two sensors 1 and 2 respectively.

$J_1$ and $J_2$ are respectively the convergence points of the sub-beams $B_{11}$ and $B_{12}$ when the beam $B_1$ issues from a point source of the imaged scene: $J_1$ and $J_2$ are thus conjugate to one another by the focal plane duplication system 3. Consequently, each of points $J_1$ and $J_2$ is equivalent to the convergence point J of the first embodiment of the invention described with reference to FIG. 1a.

Supports $10_1$ and $10_2$ may each carry supplementary image sensors, as shown in FIG. 1 b. These can be aligned with sensors 1 or 2 along the line direction DL on respective supports $10_1$ and $10_2$. Additionally, these supplementary sensors may also be arranged so that the locations of the sensors borne by support $10_2$ and conjugated by the focal plane 30 duplication system, exhibit, with respect to the sensors carried by support $10_1$, the offsets necessary for the application of the invention.

In light of the optical correspondences that have just been explained, the skilled practitioner understands that the first and second embodiments of the invention, respectively illustrated by FIGS. 1a and 1b, are equivalent. Nonetheless, the invention requires that a same portion of the scene be captured by the two sensors 1 and 2 in the length segments that overlap along the direction DL. When the two sensors 1 and 2 do not have an effective offset with respect to one another along the column direction DC, as represented in FIG. 1b, the images can be captured simultaneously by the two sensors. On the other hand, when the two sensors 1 and 2 are shifted with respect to one another along the column direction DC, each of them is activated at respective moments such that the image of the scene portion is shifted from one sensor to the other so it is in the same position on one, then on the other of the overlapping segments of each sensor at the moment the corresponding image is captured. In particular, the image shift in the focal plane or in the focal planes can result from a progressive scan of a scan swath along the longitudinal direction in the push-broom mode of image capture. The image captures by each of sensors 1 and 2 are then synchronized with this image shift. In this way, it is possible, in all cases, to capture the same image content in each of two overlapping length segments of sensor 1 and sensor 2.

Consequently, the present description can be pursued equally with reference to the embodiment of FIG. 1a or that of FIG. 1b. The projection of FIG. 2 reveals overlap R and the shift between the sensors along the depth direction P. The imaging beam indicated in this figure, therefore, corresponds simultaneously to beam $B_1$ of FIG. 1a and to sub-beams $B_{11}$ and $B_{12}$ of FIG. 1b. The same point source in the imaged scene converges on point J and produces two spots with different diameters respectively on the overlapping segments of sensors 1 and 2. These spots of different sizes cause a contrast difference between the images captured for the shared scene portion by both overlapping length segments of sensor 1 and sensor 2.

Convergence point J belongs to focal plane PF, regardless of the position of this plane which results from each adjustment of the optical focusing system 12. The position of focal plane PF, along the direction P, is identified with respect to a reference plane indicated PRef, which is fixed with respect to detector supports 10, or $10_1$ and $10_2$. Reference plane PRef can be chosen arbitrarily in depth direction P, but it is parallel to focal plane PF, regardless of the adjustment of the optical focusing system 12. Plane PRef is then fixed whereas focal plane PF is shifted parallel to direction P when the optical focusing system 12 is activated.

Each sensor 1, 2 may have the shape of a wafer whose upper face, as it appears in FIG. 2, forms its photosensitive surface. The two wafers are affixed to their respective support(s), for example, by means of spacers or glue segments whose thickness has been calibrated: 31 and 32 for sensor 1, and 33 and 34 for sensor 2. Actually, the photosensitive surface of each sensor 1, 2 is not exactly planar, but it presents variations of level that are measured between different photodetectors of this sensor along an axis, z, perpendicular to reference plane PRef.

For the invention, detectors 1 and 2 are adjusted along the depth direction P in such a way that their photosensitive surfaces in their respective overlapping segments are situated at different average heights with respect to reference plane PRef. These average heights are also measured along axis z. These result both from variations in the levels of the photosensitive surface of each sensor between different photodetectors and the height adjustment of each sensor with respect to its support 10, 10$_1$ or 10$_2$ along the direction P. Consequently, for a given adjustment of optical focusing system 12, that is to say, for a given position of focal plane PF in depth direction P, the respective overlapping segments of sensors 1 and 2 have different average separation distances with respect to focal plane PF. Thus, the distance shown as df$_1$ is the average separation distance between the photosensitive surface of sensor 1 in its overlap segment with sensor 2 with respect to focal plane PF. Similarly, the distance shown as df$_2$ is the average separation distance between the photosensitive surface of sensor 2 in its overlap segment with sensor 1 with respect to focal plane PF. Distances df$_1$ and df$_2$ can also be referred to as respective defocusing distances of sensors 1 and 2 in their overlap segments, and their difference df$_1$−df$_2$ is fixed because of the way the instrument is constructed. This is indicated as Δf below: Δf=df$_1$−df$_2$. Δf is then also the difference between the respective average heights of the two sensors 1 and 2 in their respective overlapping length segments.

Nonetheless, specific systems of assembling image sensors on supports 10, 10$_1$ or 10$_2$ may be used, which would allow difference Δf to be adjusted at a later time. For example, systems can be used that make use of a heating control to adjust, at the micrometer scale, the average heights of sensors 1 and 2 with respect to reference plane PRef.

Figure 3:
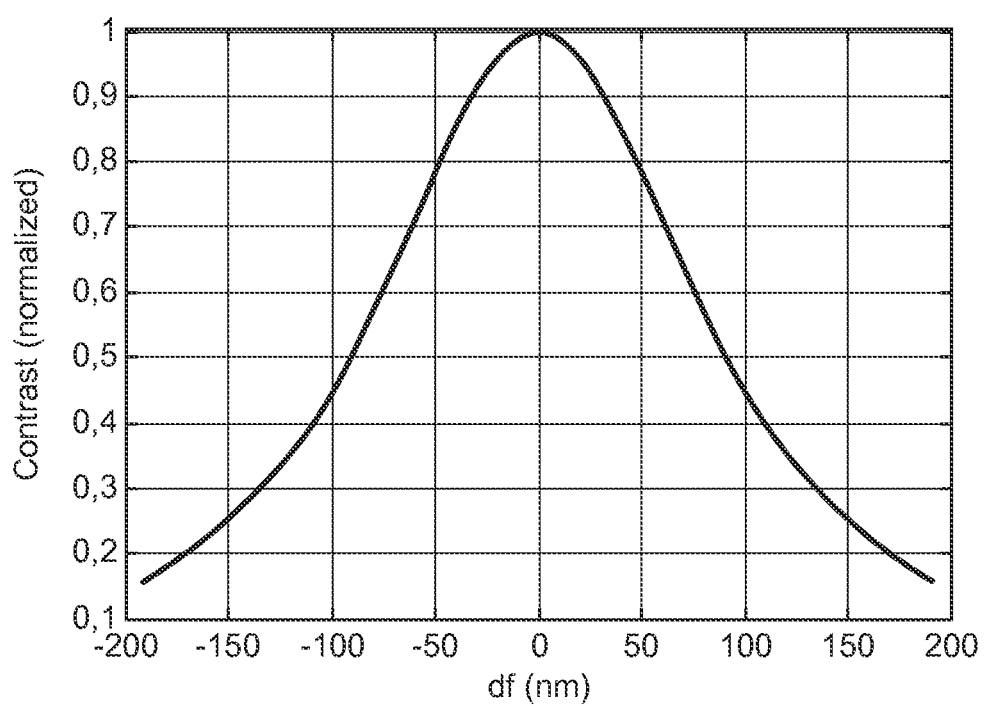
FIG. 3 is a diagram illustrating variations of an image contrast as a function of a defocusing distance.

When distance df$_1$ is zero, convergence point J is exactly on the photosensitive surface of sensor 1 in its segment overlapping sensor 2. The image of the scene portion that is then captured by this segment of sensor 1 is sharp, with maximum contrast within this segment. When df$_1$ is gradually increased, in one direction or another along the direction P, the sharpness of the image decreases in the segment of sensor 1 that overlaps sensor 2 and, as a result, its contrast decreases. FIG. 3, which will be described below, illustrates the variation in contrast as a function of the defocusing distance df$_1$, within a limit where the sensor segment is sufficiently large so that, statistically, the contrast almost no longer depends on the image content.

The contrast of an image portion captured by the segment of sensor 2 that overlaps sensor 1 varies in the same way as a function of the defocusing distance df$_2$. Nonetheless, the two images captured by the respective overlapping segments of sensors 1 and 2 cannot be perfectly sharp simultaneously, nor present defocusing distances that are equal along the z-oriented axis because of the difference Δf, which is fixed and non-zero according to the invention.

Sensors 1 and 2 are, therefore, controlled by control unit 21 to capture two images of the same portion of the scene in their respective overlapping segments. According to a first possibility, only the photodetectors of each sensor that are located in the length segment of this sensor, which overlaps the other sensor, are controlled to capture received light intensities. Alternatively, all the photodetectors of each sensor are controlled to capture received light intensities so that each sensor captures a complete image over its entire photosensitive surface.

For the contrast difference between the images captured by the two overlapping length segments of sensors 1 and 2 be more significant, the difference, Δf, may advantageously be greater than the average variation of individual levels of the photodetectors in each length segment of one of the sensors that overlaps the other sensor. Thus, a decrease in the contrast of each image of the shared scene portion is primarily due to the corresponding defocusing distance rather than to fluctuations in the level of the photosensitive surface of the sensor. The method of the invention is thus more reliable in determining the direction of the optical focus defect.

In practice, the difference Δf can be greater than 20 μm to implement the invention.

The improvement proposed now concerns the case where the images are captured by the whole photosensitive surface of sensors 1 and 2, in addition to image portions that are captured by the overlapping length segments of the sensors and used for the invention, as described below. The two images can be simultaneously sharp in the overlapping segments of the sensors when the difference, Δf, relative to the respective average heights of the two sensors 1 and 2 in the respective overlapping length segments, is less than a threshold value of the optical focus defect corresponding to a perceptible degradation of resolution. Preferably, the difference, Δf, relative to the overlapping length segments of sensors 1 and 2 may be greater than the corresponding difference measured in the non-overlapping complementary segments of the two sensors. Each complete image that is captured by one of the sensors can thus be sharp in its totality. The image capture by the two sensors, with the shared scene portion in the overlapping segments, can then be used for an imaging function. These images can, therefore, have two functions simultaneously: an imaging function for an observation mission and a function for optically focusing the instrument. The optical focus function uses a contrast reduction in at least one of the overlapping segments of the two sensors 1 and 2, which is sufficiently small not to interfere with the imaging function. In other words, the method of the invention to determine the direction of the optical focus defect is sufficiently sensitive with respect to a reduction in contrast so that this reduction does not significantly impair the quality of the captured images.

Given that the two images are captured without modification of the adjustment of the optical focus system 12 between them, no minimum duration occurs between the two images to allow for such modification. The two images corresponding to the same portion of the scene that is captured at the same time by each of two sensors 1 and 2 can have a given extension along the column direction DC. In particular, this extension within the focal plane PF can cover a single line along the direction DC, or 64 TDI stages arranged successively along the direction DC when sensors 1 and 2 are of the TDI type.

A contrast value is then calculated separately for each image portion that is captured in one of the length segments of the sensor that overlaps the other sensor. FIG. 3 is a diagram of the contrast values that have been obtained as a function of the existing defocusing distance for each image, df$_1$ or df$_2$, generically indicated as df. Actually, this is represented by the quadratic error of the wavefront, expressed in nanometers (nm). The use of this diagram increases in accuracy when each sensor length segment from which the contrast value is calculated contains a large number of separate photodetectors. For example, each sensor length segment that overlaps the other sensor may correspond to 100 columns and 64 adjacent photodetector lines, or 64 TDI stages. It may also comprise only a single line of photodetectors, especially when sensors 1 and 2 are themselves limited to a single line of photodetectors.

For several reasons, the contrast curve of FIG. 3 relative to one of the sensors, for example, sensor 2, may be offset toward contrast values that are lower in comparison to the same curve for sensor 1. Among those reasons, we can especially cite a misalignment of the two sensors 1 and 2, so that their respective column directions are not strictly coincident or conjugated. However, such a misalignment can be partially compensated for by adjusting the image between the two sensors. Another reason is a greater variation of the individual photodetector levels along axis z of one of the sensors with respect to the other. Each of the diagrams in FIGS. 4a to 4d gathers the contrast variation curves of the two sensors 1 and 2, by normalizing them, for example, with respect to the maximum contrast value for sensor 1.

FIGS. 4a to 4d, respectively, illustrate four possible situations for the contrast values separately obtained for sensor 1 and sensor 2, in their respective overlapping length segments. The difference $\Delta f$ along the axis of abscissas df, between two points each on one of the two curves and which correspond respectively to sensor 1 and to sensor 2, is fixed and constant. $\Delta C$ represents the difference between the contrast values that were calculated separately for the two sensors 1 and 2 in their overlapping length segments.

Figure 4A:
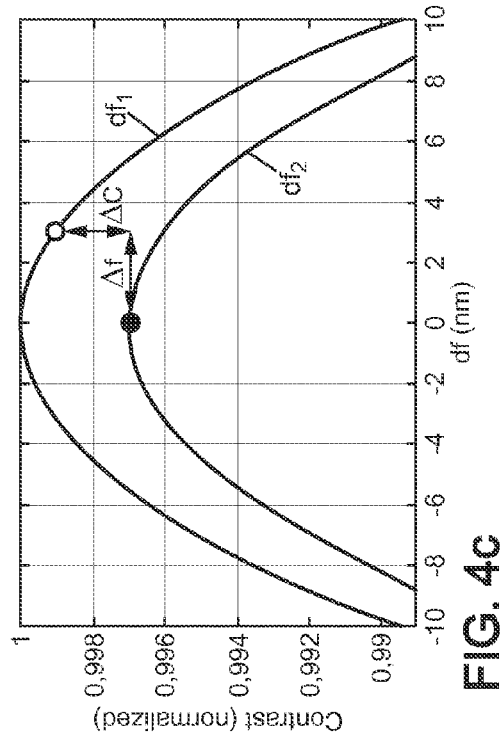
FIGS. 4a-4d are diagrams similar to FIG. 3, for illustrating several possible situations.

In the situation shown in FIG. 4a, the contrast value for sensor 1 is higher than that for sensor 2, while the absolute value of the defocusing distance $df_1$ is smaller than that of $df_2$. Focal plane PF is thus located on the side of the surface of sensor 1 that is opposite the surface of sensor 2 along direction P in the overlapping length segments.

Figure 4C:
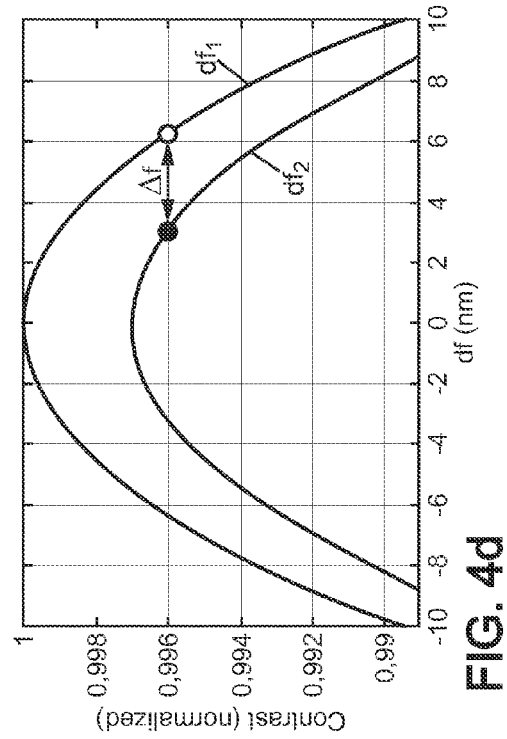
Figure 4B:
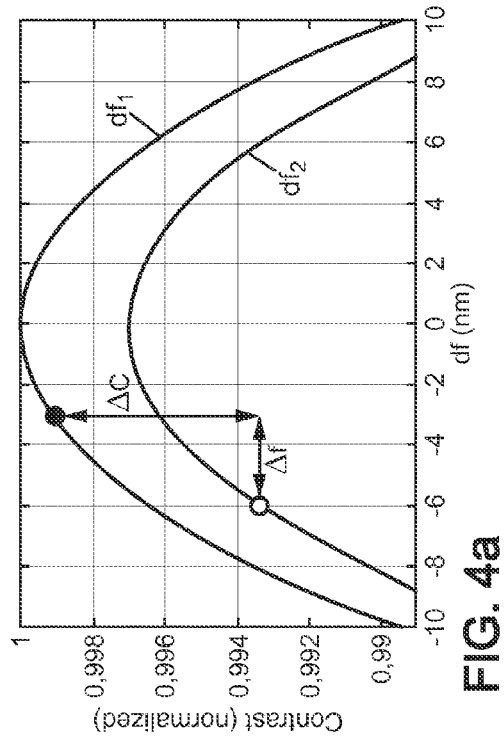

In the situation shown in FIG. 4b, the contrast value for sensor 1 is lower than that for sensor 2, while the absolute value of the defocusing distance $df_1$ is greater than that of $df_2$. Focal plane PF is now located on the side of the surface of sensor 2 that is opposite the surface of sensor 1 along direction P in the overlapping length segments.

Thus, in these two situations, focal plane PF is located on the side of the surface of the sensor for which the contrast value is the highest, opposite the surface of the sensor for which the contrast value is the lowest. In an equivalent manner and when the optical focus defect is understood to be initially oriented from the actual position of focal plane PF towards the surfaces of the sensors, the direction of the existing optical focus defect goes from the position of the surface of the sensor for which the contrast value is highest to that of the sensor for which the contrast value is lowest.

The situation illustrated in FIG. 4c is caused by the difference between the respective contrast curves of the two sensors 1 and 2: the contrast value for sensor 1 is higher than that for sensor 2, while the absolute value of defocusing distance $df_1$ is greater than $df_2$. The preceding rule then leads to an erroneous determination of the direction of the existing defect in the instrument's optical focus.

Figure 4D:
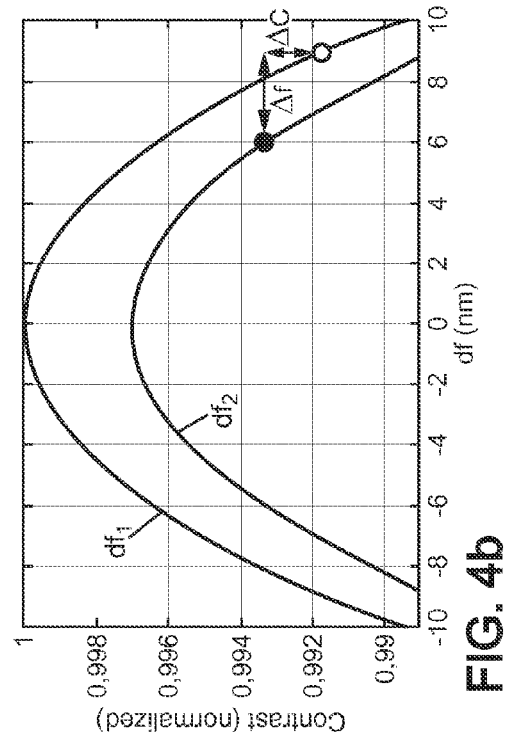

Finally, the situation of FIG. 4d is indeterminate when applying the rule described above to determine the direction of the existing defect in the instrument's optical focus.

However, the situations of FIGS. 4c and 4d are even less probable when the difference is smaller between the respective curves of contrast variation as a function of defocusing distance for both sensors.

When a focal plane PF duplication system 3 is used (FIG. 1b), the same reasoning applies when comparing the relative positions of the photosensitive surface of sensor 1 and location 2', which is conjugated by system 3 to the photosensitive surface of sensor 2.

Possibly, determination of the direction of the optical focus defect can be completed through an evaluation of the length of this defect. Such an evaluation can be realized by extrapolation from the curve of FIG. 3, starting from a value of the difference $\Delta f$ which is known through construction of the instrument, and the difference $\Delta C$ between the calculated contrast values. The extrapolated length thus obtained indicates a coarse adjustment for focusing system 12, with a direction opposite that of the existing focusing defect.

The method of the invention can also be completed by adjusting the optical focus system 12 to reduce the focusing defect globally for the two sensors 1 and 2. Such an adjustment can be realized so as to move focal plane PF in accordance with the length of the focusing defect as evaluated above in the direction opposite the existing defect. Alternatively, the existing focusing defect can be reduced incrementally by moving focal plane PF with a fixed length, again in the direction opposite the existing defect, then by continuing through dichotomy. Where applicable, the two methods can be applied successively to more quickly obtain the best adjustment of the instrument's optical focus.

Where situations similar to those of FIGS. 4c and 4d might accidentally lead to moving focal plane PF in the direction of a degradation of the optical focus, one of the situations of FIGS. 4a and 4b would again appear subsequently, ultimately leading to the best adjustment of optical focus. Consequently, the present invention is robust with respect to a difference that could exist between the two contrast curves relative to sensor 1 and sensor 2.

In a general and particularly advantageous manner, the invention can be applied to the push-broom method of image capture, wherein images are progressively or successively captured during a progression in the scene which is parallel to the direction of the columns of sensors, in the or each focal plane.

However, it is understood that the invention that has been described in detail above can be reproduced by introducing various adaptations or variations. In particular, the invention is compatible with image sensors, each of which can operate with continuous line-by-line readout, known as "rolling" mode. It is also compatible with sensors, each of which operates with simultaneous exposure of all the photodetectors of the same sensor, or in "snapshot" mode.

The invention is also compatible with the acquisition of images by scanning, especially with the across-track scanning which is prioritary over a longitudinal displacement, or push-broom scanning. Alternatively, image acquisition can be simultaneous for the entire field of view, known as "staring" mode. In this case matrix detectors can be used, for example, with 2,000 lines counted along the column direction, where each line can contain 6,000 photodetectors.

Figure 5:
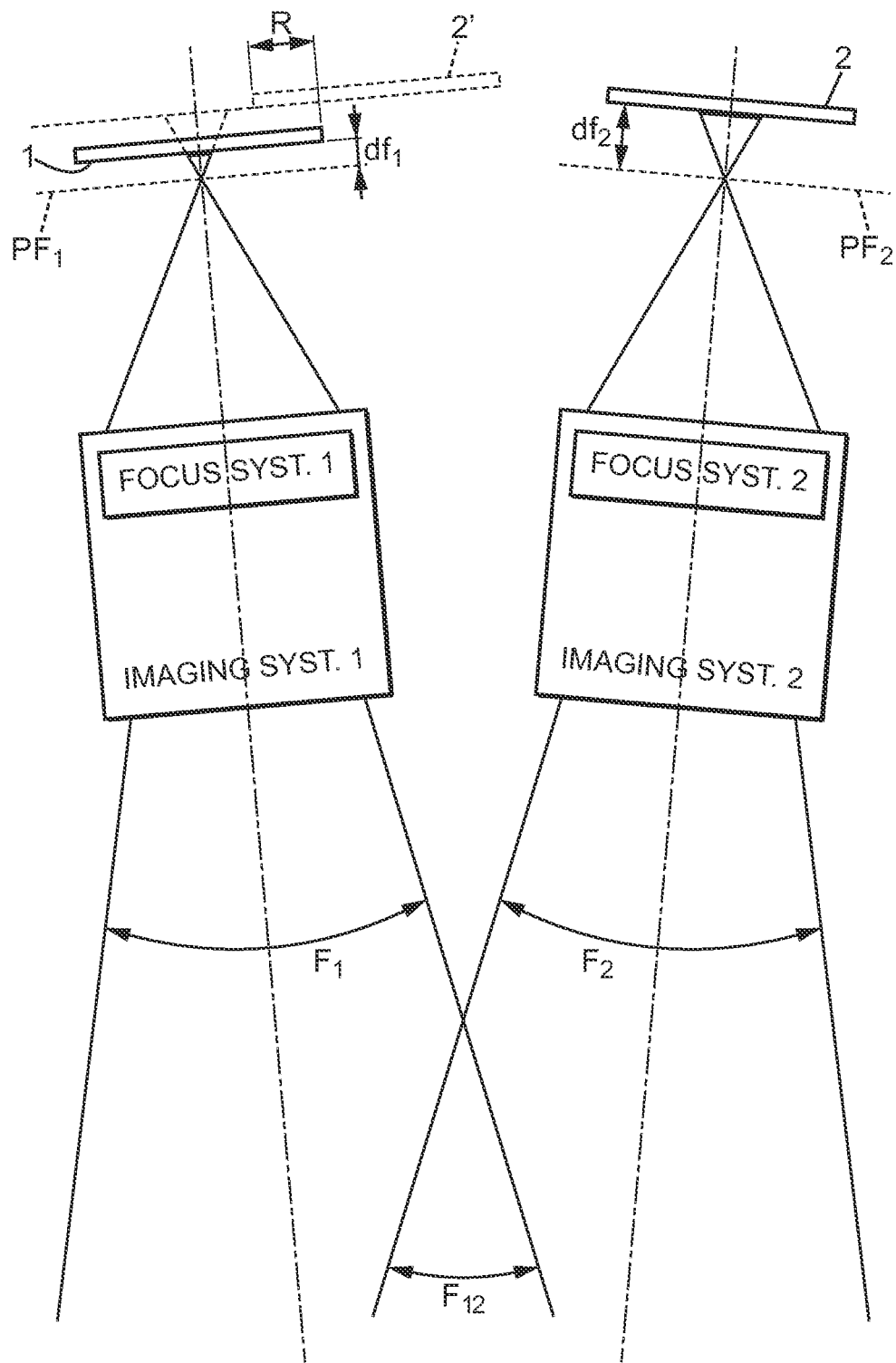
FIG. 5 is a block diagram of an assembly of two image capture instruments to which the invention can be applied.

Finally, FIG. 5 illustrates a variant embodiment of the invention for two image capture instruments arranged to operate in parallel. The first instrument comprises the image formation optics, shown as IMAGING SYST. 1, with focusing system FOCUS SYST. 1, and image sensor 1. The second instrument comprises image formation optics IMAGING SYST. 2, image sensor 2, and focusing system FOCUS SYST. 2. The entrance optical fields of the two instruments are indicated respectively as $F_1$ and $F_2$, and their overlap with one another is shown as $F_{12}$. $PF_1$ and $PF_2$ are the respective focal planes of IMAGING SYST. 1 and IMAGING SYST. 2 optical systems. The other references used in FIG. 5 are identical to those used in FIGS. 1a, 1b, and 2. The two image sensors 1 and 2 are oriented so that each is parallel to the same direction in the scene, within overlap $F_{12}$ of the entrance optical fields. They then exhibit respective length segments that are conjugated with overlap $F_{12}$ of the entrance optical fields. These length segments correspond to the overlap, R, of FIGS. 1a, 1b, and 2. Preferably, the two image formation optics may have identical optical characteristics on the one hand and, on the other hand, the individual dimensions of pixel detection elements in the two sensors 1 and 2 may also be identical. Through the principle of optical equivalence between the structure of FIG. 1a or 1b, and that of FIG. 5, the detailed description of the invention that has already been supplied in the case of a single image formation optical system, can be transposed without difficulty to the present case of two optical systems that operate in parallel.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

What is claimed is:

1. A method for characterizing an optical focusing defect of an image capture instrument, wherein the instrument comprises:
    an image formation optical system configured for forming an image of a scene in at least one focal plane;
    at least two image sensors, each of which comprises a set of pixel detection elements arranged at intersections of at least one line and columns of a sensor matrix, both sensors being placed parallel to said at least one focal plane and oriented so that directions of respective lines of the sensors are identical or optically conjugated by a focal plane duplication system, and wherein the at least two image sensors are offset relative to one another parallel to the directions of the lines with a partial overlap of said sensors along the directions of the lines, so that each sensor has a length segment overlapping the other sensor and a complementary segment that does not overlap the other sensor;
    a control unit configured for controlling an image capture operation coordinated between the at least two image sensors; and
    an optical focusing system suitable for shifting said at least one focal plane of the image formation optical system with respect to the sensors in a direction perpendicular to each sensor;
wherein the method comprises the following steps:
    capturing two images of a same portion of the scene respectively with both of the at least two image sensors in the respective overlapping length segments of said sensors;
    calculating two values of a contrast separately for the two images of the same scene portion; and
    deriving a direction of the optical focusing defect along the direction perpendicular to each sensor, based on a comparison of the contrast values calculated respectively for the two images of the scene portion;

wherein:
    the at least two image sensors are mounted within the instrument with respective average heights that are different in the respective overlapping length segments, said heights being measured along the direction perpendicular to each sensor with respect to a shared reference plane or reference planes respectively associated with each sensor and conjugated with one another by the focal plane duplication system; and
    the two images are captured for one and the same adjustment of the focusing system, so that said at least one focal plane of the image formation optical system is situated for said images at different respective defocusing distances of the at least two image sensors.

2. The method according to claim 1, wherein the direction of the focusing defect, when counted from said at least one focal plane, is determined as originating from a photosensitive surface position of that one among the two sensors with the highest contrast value, toward a photosensitive surface position of the sensor with the lowest contrast value, the positions of the photosensitive surfaces being identified for the length segments which overlap between the at least two image sensors.

3. The method according to claim 1, wherein a difference between the respective average heights of the at least two image sensors in the respective overlapping length segments is greater than an average variation of individual levels of the pixel detection elements in each length segment of one of the sensors that overlaps the other sensor, said levels being measured along the direction perpendicular to each sensor.

4. The method according to claim 1, wherein the difference between the respective average heights of the at least two image sensors in the respective overlapping length segments is greater than 20 μm.

5. The method according to claim 1, wherein the difference between the respective average heights of the at least two image sensors in the respective overlapping length segments is less than a threshold value for the optical focusing defect, which corresponds to a degradation of the resolution of a captured image.

6. The method according to claim 1, wherein the two sensors each has a single line of pixel detection elements, counted along a direction of columns of the sensor, or each of the at least two image sensors is of time delay integration type.

7. The method according to claim 1, wherein a complete image is captured by also using the non-overlapping complementary segments of the sensors, said complete image including the two images of the scene portion captured redundantly by the overlapping length segments of the sensors.

8. The method according to claim 1, wherein the at least two image sensors are also offset to one another parallel to a column direction of each sensor and the control unit is suitable for controlling the capturing two images step so that the two images are captured respectively by both sensors with a delay between said two images corresponding to a displacement of the scene portion in said at least one focal plane from one of the at least two image sensors to the other sensor along the column direction.

9. The method according to claim 1, also comprising the following step:
    activating the optical focusing system to displace said at least one focal plane of the image formation optics in the direction opposite that of the focusing defect.

10. The method according to claim 1, also comprises a calculation by extrapolation of a coarse adjustment of the focusing system to move said at least one focal plane closer to an average position of the sensors along the direction perpendicular to each sensor, the coarse adjustment being extrapolated from the contrast values calculated respectively for the two images of the scene portion.

11. An image capture instrument comprising:
an image formation optical system configured for forming an image of a scene in at least one focal plane;
at least two image sensors, each of which comprises a set of pixel detection elements pixels arranged at intersections of at least one line and columns of a sensor matrix, both sensors being placed parallel to said at least one focal plane and oriented so that respective line directions of said sensors are identical or optically conjugated by a focal plane duplication system, wherein the at least two image sensors are offset to one another parallel to the directions of the lines with a partial overlap of said sensors along the directions of the lines, so that each sensor has a length segment overlapping the other sensor and a complementary segment that does not overlap the other sensor;
a control unit configured for controlling an image capture operation coordinated between the at least two image sensors;
an optical focusing system configured for shifting said at least one focal plane of the image formation optics with respect to the sensors along a direction perpendicular to each sensor; and
an optical focus controller configured for controlling execution of the following steps:
in cooperation with the control unit, capturing two images of the same portion of a scene respectively with both of the at least two image sensors in the different respective overlapping length segments of said sensors;
calculating two values of a contrast separately for the two images of the same scene portion; and
deriving a direction of the optical focusing defect along the direction perpendicular to each sensor, based on a comparison of the contrast values obtained respectively for the two images of the scene portion;
wherein:
the at least two image sensors are mounted within the instrument with respective average heights that are different in the respective overlapping length segments, said heights being measured along the direction perpendicular to each sensor with respect to a shared reference plane or reference planes respectively associated with each sensor and conjugated with one another by the focal plane duplication system; and
the focus controller is configured for controlling the capture of the two images for a same adjustment of the focusing system, so that said at least one focal plane of the image formation optical system is situated for said images at respective defocusing distances of the at least two image sensors.

12. An instrument according to claim 11, wherein the optical focus controller is configured for determining the direction of the focusing defect when it is counted from said at least one focal plane, as originating from a photosensitive surface position of that of the at least two image sensors with the highest contrast value, toward a photosensitive surface position of the sensor with the lowest contrast value, the positions of the photosensitive surfaces being identified for the overlapping length segments between the at least two image sensors.

13. The instrument according to claim 11, wherein a difference between the respective average heights of the at least two image sensors in the respective overlapping length segments is greater than an average variation of individual levels of pixel detection elements in each length segment of one of the sensors that overlaps the other sensor, said levels being measured along the direction perpendicular to each sensor.

14. The instrument according to claim 11, wherein the difference between the respective average heights of the at least two image sensors in the respective overlapping length segments is greater than 20 μm.

15. The instrument according to claim 11, wherein the difference between the respective average heights of the at least two image sensors in the respective overlapping length segments is less than a threshold value for the optical focusing defect, which corresponds to a loss of resolution associated with a size of pixel detection elements of the sensors.

16. The instrument according to claim 11, wherein the difference between the respective average heights of the at least two image sensors in the respective overlapping length segments is greater than a difference between the respective average heights of said sensors in the complementary non-overlapping segments.

17. The instrument according to claim 11, wherein the at least two image sensors are also offset to one another parallel to a column direction of each sensor, and
the control unit is configured for controlling the capturing of two images so that the two images are captured respectively by both sensors with a delay between said two images corresponding to a displacement of the scene portion in said at least one focal plane from one of the at least two image sensors to the other sensor along the column direction.

18. A method of assembling an image capture instrument, comprising the following steps:
providing an image formation optical system configured for forming an image of a scene in at least one focal plane;
placing at least two image sensors parallel to said at least one focal plane (PF), each sensor comprising a set of pixel detection elements arranged at intersections of at least one line and columns of a matrix of said sensor, wherein both sensors are oriented so that respective line directions of said sensors are identical or optically conjugated by a focal plane duplication system, and wherein the at least two image sensors are offset to one another parallel to the directions of the lines with a partial overlap of said sensors along the directions of the lines, so that each sensor has a length segment overlapping the other sensor and a complementary segment that does not overlap the other sensor;
adjusting the respective average heights of the at least two image sensors within the instrument so that said average heights are different between the at least two image sensors in the respective length segments that overlap, wherein said heights are measured along the direction perpendicular to each sensor with respect to a shared reference plane (PRef) or reference planes respectively associated with each sensor and conjugated with one another by the focal plane duplication system;
supplying a control unit configured for controlling an image capture operation coordinated between the at least two image sensors;
supplying an optical focusing system configured for shifting said at least one focal plane of the image formation optics with respect to the sensors in a direction perpendicular to each sensor; and
supplying an optical focus controller;

wherein the optical focus controller is configured for characterizing an optical focusing defect direction of the image capture instrument.

19. The assembly method according to claim 18, wherein the height of each sensor is adjusted by arranging at least one spacer between the sensor and a support of said sensor within the instrument.

20. The assembly method according to claim 18, wherein the sensors are mounted within the instrument so that a difference is definitively established due to the assembly, between the respective average heights of said sensors in the overlapping length segments.

21. The assembly method according to claim 18, also comprising the following preliminary step:
obtaining a value of average variation of the individual levels of the pixel detection elements within each length segment of one of the sensors that overlaps the other sensor, wherein said levels are measured along the direction perpendicular to each sensor;
and wherein the respective average heights of the at least two image sensors are adjusted so that a difference between said average heights in the respective overlapping length segments is greater than the value of the average variation of the individual levels of the pixel detection elements within each length segment of one of the sensors that overlaps the other sensor.

22. The assembly method according to claim 18, wherein the respective average heights of the at least two image sensors are adjusted so that the difference between said average heights in the respective overlapping length segments is greater than 20 μm.

23. The assembly method according to claim 18, wherein the respective average heights of the at least two image sensors are adjusted so that the difference between the respective average heights of the at least two image sensors in the respective overlapping length segments is less than a threshold value of the optical focusing defect, which corresponds to a loss of resolution associated with a size of pixel detection elements of the sensors.

24. A method for characterizing an optical focusing defect of one image capture instrument among two image capture instruments, wherein each instrument comprises, separately from the other instrument:
an image formation optical system configured for forming an image of a scene in a focal plane;
an image sensor placed parallel to a focal plane and comprising an assembly of pixel detection elements arranged at the intersections of at least one line and columns of a sensor matrix; and
an optical focusing system configured for moving the focal plane of the image formation optical system with respect to the sensor along a direction perpendicular to the sensor;
wherein the two instruments are arranged in parallel so that the entrance optical fields respectively conjugated with the two sensors by the respective image formation optical systems, exhibit a partial overlap in the scene, and wherein the two instruments are oriented around respective optical axes so that lines of pixel detection elements of the two sensors are parallel to a shared direction in the scene, respective length segments of the two sensors, each of which is conjugated with the overlap of the entrance optical fields, being denoted as overlapping length segments of the sensors;
wherein a control unit is configured for controlling an image capture operation coordinated between the two instruments; and
wherein the method comprises the following steps:
capturing two images of a same portion of a scene respectively with both of two instruments in the respective overlapping length segments of the sensors;
calculating two values of a contrast separately for the two images of the same scene portion; and
deriving a direction of the focusing defect along the direction perpendicular to each sensor based on a comparison of the contrast values calculated respectively for the two images of the scene portion;
wherein:
the two images are captured for respective adjustments that are different for the two focusing systems so that the respective focal planes of the two image formation optical systems are situated, for said images, at different respective defocusing distances of the two sensors.

25. The method according to claim 24, wherein the direction of the focusing defect for one of the two instruments, when it is counted from the focal plane of said instrument, is determined as originating from a photosensitive surface position of that of the two sensors with the highest contrast value, toward a photosensitive surface position of the sensor with the lowest contrast value, the positions of the photosensitive surfaces being identified for the overlapping length segments between the two sensors and reported to that of the two instruments for which the focusing defect direction has been determined.

* * * * *